United States Patent
Jacobson et al.

(10) Patent No.: US 8,971,663 B2
(45) Date of Patent: Mar. 3, 2015

(54) SYSTEM AND METHOD FOR PRODUCING SYNTHETIC GOLDEN TEMPLATE IMAGE FOR VISION SYSTEM INSPECTION OF MULTI-LAYER PATTERNS

(71) Applicants: Lowell D. Jacobson, Grafton, MA (US); Gang Liu, Natick, MA (US)

(72) Inventors: Lowell D. Jacobson, Grafton, MA (US); Gang Liu, Natick, MA (US)

(73) Assignee: Cognex Corporation, Natick, MA (US)

( * ) Notice: Subject to any disclaimer, the term of this patent is extended or adjusted under 35 U.S.C. 154(b) by 64 days.

(21) Appl. No.: 13/625,021

(22) Filed: Sep. 24, 2012

(65) Prior Publication Data

US 2013/0308875 A1   Nov. 21, 2013

Related U.S. Application Data

(60) Provisional application No. 61/649,861, filed on May 21, 2012.

(51) Int. Cl.
  G06K 9/36 (2006.01)
  G06K 9/32 (2006.01)
  G06K 9/62 (2006.01)
  G06T 7/00 (2006.01)
  G06K 9/00 (2006.01)

(52) U.S. Cl.
  CPC ............ *G06K 9/3216* (2013.01); *G06K 9/6255* (2013.01); *G06T 7/001* (2013.01); *G06T 2207/10024* (2013.01); *G06T 2207/20221* (2013.01); *G06T 2207/30144* (2013.01)
  USPC ....................................................... 382/284

(58) Field of Classification Search
  USPC .................. 382/150, 154, 173, 203, 209, 284
  See application file for complete search history.

(56) References Cited

U.S. PATENT DOCUMENTS

| | | |
|---|---|---|
| 5,640,200 A | 6/1997 | Michael |
| 5,850,466 A | 12/1998 | Schott et al. |
| 5,949,905 A * | 9/1999 | Nichani et al. ................ 382/173 |
| 6,173,087 B1 | 1/2001 | Kumar et al. |
| 6,289,117 B1 * | 9/2001 | Li ................................ 382/150 |
| 6,396,949 B1 | 5/2002 | Nichani |
| 6,421,458 B2 | 7/2002 | Michael et al. |
| 6,539,107 B1 * | 3/2003 | Michael et al. ............... 382/154 |
| 6,563,960 B1 | 5/2003 | Chan et al. |
| 7,127,090 B2 | 10/2006 | Kreang-Arekul et al. |

(Continued)

OTHER PUBLICATIONS

Cognex Corporation, "PatInspect Theory: Users Guide", (2010).
Cognex Corporation, "Cognex MVS-8000 Series", CVL Vision Tools Guide, CVL 7.0, Feb. 2011.

*Primary Examiner* — Amir Alavi
(74) *Attorney, Agent, or Firm* — Loginov & Associates, PLLC (57) ABSTRACT

A system and method for generating golden template images in a vision system to inspect an acquired runtime image of an object with a multi-layer printed pattern is provided. The system and method performs a registration process on runtime images using registration models each trained on respective canonical layer mask images, and outputting poses. Based upon the poses, warped layer masks are generated. Combination masks are computed based upon differing combinations of the warped layer masks. Intensity values for pixels of the foreground regions for the combination masks are estimated. The estimated intensity values are then blended associated with the combination masks to generate a golden template image. This golden template image can be used to compare with a runtime image. An exemplary application of this system and method is in print inspection on flat and non-flat surfaces.

26 Claims, 11 Drawing Sheets

(56) References Cited

U.S. PATENT DOCUMENTS

| | | | |
|---|---|---|---|
| 7,689,029 B2 | 3/2010 | Onishi et al. | |
| 7,734,084 B2 | 6/2010 | Stewart et al. | |
| 8,437,502 B1 | 5/2013 | Siddiqui et al. | |
| 2013/0308875 A1* | 11/2013 | Jacobson et al. | 382/284 |

* cited by examiner

SYSTEM AND METHOD FOR PRODUCING SYNTHETIC GOLDEN TEMPLATE IMAGE FOR VISION SYSTEM INSPECTION OF MULTI-LAYER PATTERNS

RELATED APPLICATION

This application claims the benefit of U.S. Provisional Application Ser. No. 61/649,861, entitled SYSTEM AND METHOD FOR PRODUCING SYNTHETIC GOLDEN TEMPLATE IMAGE FOR VISION SYSTEM INSPECTION OF MULTI-LAYER PATTERNS, by Lowell D. Jacobson, et al., filed May 21, 2012, the entire disclosure of which is incorporated herein by reference.

FIELD OF THE INVENTION

This invention relates to machine vision systems and more particularly to templates for use in vision systems for inspecting objects and patterns.

BACKGROUND OF THE INVENTION

It is often desirable in manufacturing processes to apply a plurality of printed, or otherwise patterned, layers to a surface of an object using various application techniques such as pad-printing, lithography and the like. For example, in printing processes a page may contain multiple layers of ink to generate a multi-colored image. Many other objects, such as printed-iris contact lenses, semiconductor wafers, and even golf balls may also contain a multi-layer printed pattern on at least a part of their surface. These patterns may or may not overlap, in at least some locations of the surface. In such processes, manufacturers attempt to minimize defects, which can occur (for example) due to misalignment among the layers or due to extra or missing ink in one or more of the layers.

One approach to minimizing defects is to perform visual inspection of a printed surface using a machine vision system, (also termed simply a "vision system" herein). In a single-layer structure this can be accomplished using a so-called "golden template" comparison (GTC), in which a reference image (the golden template) is generated from one or more images of good parts. The golden template image is subsequently subtracted from the image of each part to be inspected to produce an intensity or color "difference image". Global or regional amplitude differences between the golden template and the runtime image may be normalized away prior to subtraction. And the difference image can either be signed or absolute. Significant differences are usually associated with defects in the runtime part. Regions of difference can be detected and quantified by a variety of techniques, such as blob segmentation and connectivity analysis. If differences exceed acceptable intensity or size thresholds, then the part can be considered defective.

However, the application of standard GTC processes to a multi-layered print surface is significantly more problematic. For example, overlap between layers that vary from object to object (because of differing alignment among layers) are not easily resolved by a single golden template. As such it is desirable to provide a system and method for generating a golden template that allows a multi-layer printed/patterned surface (typically having a differing color in each layer) to be inspected by a vision system.

SUMMARY OF THE INVENTION

This invention overcomes disadvantages of the prior art by providing a system and method for generating golden template images and using golden template comparison (GTC) to inspect multi-layered printed/patterned surfaces, that employs as inputs a) an acquired image (e.g. grayscale or color) to be inspected, and b) a set of (binary) mask images (one image per print layer). Each mask image (herein termed a "layer mask") describes the region of the acquired image that should be occupied by the color associated with that printed layer. These inputs are then used to generate a synthetic golden template image with which the first (acquired) image can be inspected. The binary mask image for each printed layer can be derived from a variety of image data— such as the original print artwork from which a pad-printing cliché or offset-printing plate is produced. This image is used to train registration models (that operate with vision system tools) specific to that layer. Given an image to be inspected, the layer registration models are used to independently register the linear, or more generally the nonlinear, pose of each printed layer in the runtime image. Each layer mask image is then warped into the runtime image domain using the corresponding registration pose estimated for that layer so as to account for the translation, angle, scale, and distortion of that layer in the runtime image. In an embodiment, the registration pose can be nonlinear. The illustrative system and method then uses logical operations to combine the warped layer masks so as to obtain a new set of combination masks that describe regions in the runtime image that should be covered with the first print layer only, the second print layer only, or by both layers in an overlap therebetween (and so on where there are more than two layers present). Using these combination masks as well as the input image to be inspected, parameters are next estimated for each layer combination (mask), such as its expected color (including slow spatial variation). These parameters are then used in a filling in process, constrained by the combination mask boundaries, to create a golden template image that is customized to each runtime image to be inspected. Because the number of parameters estimated is small compared to the number of pixels in the runtime, inspected image, the illustrative system and method enables synthesis of a defect-free golden template image even when the image used to learn that template has defects. The inspection then uses the synthetic golden template image in a traditional image subtraction procedure to allow the detection of regions of missing or extra print using known techniques.

Illustratively if a runtime, inspected image has significant gross defects, then these are typically detected during the process of registration and parameter estimation. For example, if a print layer is missing altogether, then the step to register that layer and its distortion will fail altogether, or have a very low score. Similarly, estimated parameters for color or intensity of printed layers should be verified to be within an acceptable range.

While in various embodiments, inspection comprises subtraction of the golden template from the runtime image, in alternate embodiments the system and method can compute various representations from the runtime image and the golden template image, and carry out the inspection on these derived representations. This includes, for example, smoothing or high-pass filtering both the runtime and golden template images, or computing a multi-scale, Fourier or wavelet description from both images, before comparison. These derived representations could then be compared via subtraction and difference thresholding, or using other comparison metrics known to the art, in order to detect defects.

In an illustrative embodiment, a system and method for generating golden template images in a vision system to inspect an acquired runtime image of an object with a multi-layer printed pattern is provided. This system and method performs a registration process on the runtime image of each part to determine the pose of each expected layer in a set of layers with undistorted geometries described by a set of canonical layer mask images. The determined layer poses are then used to warp each canonical layer mask to produce a new set of runtime, "warped layer masks". The warped layer masks can be generated from the canonical layer masks based upon distortion within a training image or distortion in a currently acquired runtime image or a previously acquired runtime image. A set of combination masks is then computed which describe every possible combination of the warped layer masks. The intensity or color (e.g. RGB) is estimated over the foreground region of each combination mask. The intensity or color can also optionally be estimated for the "overall background region," defined as the intersection of the backgrounds of all warped layer masks. The estimated intensities or colors associated with each separate combination mask are then blended together to produce a golden template image that can be used in the runtime inspection of images. The canonical layer masks illustratively define a fuzzy edge that subsequently provides warped layer masks and combination masks with fuzzy edges (anti-aliased masks). The canonical layer masks can be warped based upon the estimated linear or nonlinear distortion within a version of the runtime image. Illustratively, the canonical layer masks can be warped based upon distortion in the currently acquired runtime image as computed in the registration step. Alternatively, pre-trained distortion information can be used to pre-warp the canonical layer masks for use as runtime registration models. By way of example, in inspecting a ball, spherical distortion can be provided as the pre-warped distortion information to warp the canonical layer masks so that they include a standard spherical distortion pattern. Subsequent distortion can be applied during registration using either runtime image data or training image data from previously acquired images (or another set of distortion information). According to an embodiment, prior to blending, image regions associated with each of the combination masks are filled with estimated intensity values. In an illustrative embodiment, the blending method can also include special processing to determine anti-aliased intensity values for pixels located in fuzzy transition regions between combination masks. In general, blending can comprise the consolidation of intensity estimates associated with the various combination mask regions into a single image. In an illustrative embodiment, this can be accomplished using a weighted average of intensities. Also, in an embodiment, some or all of the combination masks can be employed to generate weighting masks for use in subsequent inspection cycles or other actions related to the overall runtime process.

BRIEF DESCRIPTION OF THE DRAWINGS

The invention description below refers to the accompanying drawings, of which.

DETAILED DESCRIPTION

Figure 1:
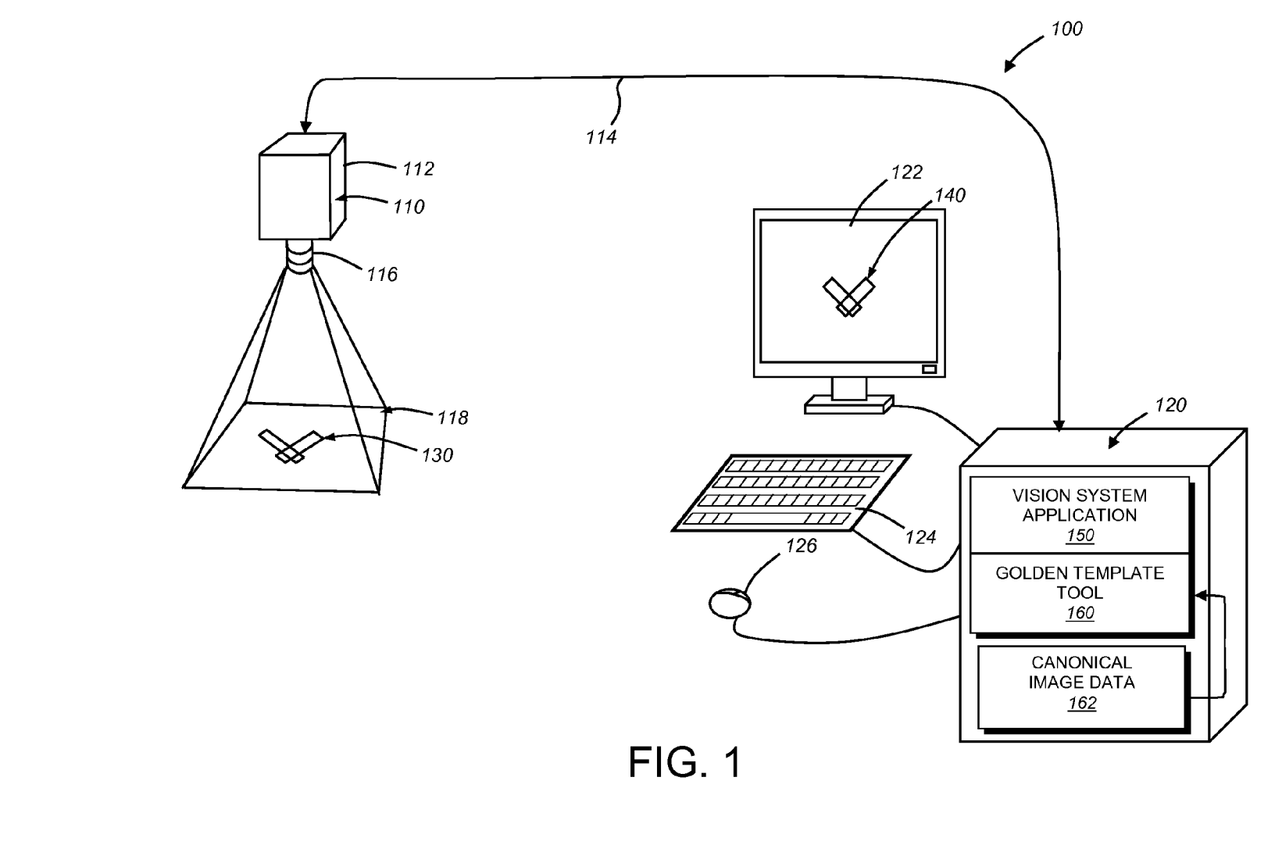
FIG. 1 is a diagram of an exemplary vision system arrangement including a vision system camera interconnected to a computing device that operates a vision system including a golden template generation and comparison tool according to an illustrative embodiment, in which an image of a multi-layer printed surface is acquired and inspected.

An exemplary vision system arrangement 100 that can be employed according to an illustrative embodiment is shown in FIG. 1. The system 100 includes one or more vision system cameras, represented for simplicity by vision system camera 110. This illustrative camera 110 includes a camera body 112 containing an image sensor (or imager, not shown) and associated electronics for acquiring and transmitting image frames to a computing device 120 via a link 114 that is typically wired, but can be wireless. The camera 110 includes an appropriate lens 116 focused upon a scene 118 that contains an object 130 under inspection. The camera can include internal and/or external illuminators (not shown) that operate in accordance with the image acquisition process. The computing device can be any acceptable processor-based system capable of storing and manipulating image data in accordance with the illustrative embodiment. In an embodiment, the computing device 120 can comprise a personal computer PC running an appropriate operating system, such as the Windows® operating system, provided by Microsoft Corporation of Redmond, Wash. The computing device 120 can include appropriate peripherals, such as a bus-based image capture card that interconnects to the camera. In alternate embodiments, the vision processor can be partially or fully contained within the camera body itself. The computing device 120 optionally includes an appropriate display 122 (herein showing an acquired image 140 of the scene 118 and object 130), which can support an appropriate graphical user interface (GUI) that can operate in accordance with a stored vision system application 150. Note that a display can be omitted in various embodiments and/or provided only for setup and service functions. The application 150 can be any acceptable software and/or hardware package that is acceptable for use in the inspection of objects, such as those commercially available from Cognex Corporation of Natick, Mass. The computing device can also include associated user interface (UI) components, including, for example, a keyboard 124 and mouse 126.

According to an illustrative embodiment, the vision system application 150 interoperates with one or more applications/processes (running on the computing device 120) that collectively comprise a golden template tool 160 for use in the inspection of multi-layer printed/patterned surfaces. As described below, part of the tool's function is to generate a plurality of golden template image data sets, typically during runtime, based upon undistorted (canonical) image data 162 provided by a variety of possible sources. For example, in the case of a pad-printed object, such as a printed-iris contact lens, the undistorted image data can be the original digital artwork for each iris layer used to create the ink cliché that inks the printing pad in production. The image data can also be one or more actual acquired images of a good print specimen. These images can be further modified as appropriate to eliminate small random defects in creating the canonical image of each layer. In other examples, the canonical image data can be a synthetic image of the printed layer constructed by a user.

Note, the various processes and procedure performed herein can be accomplished using electronic hardware, software, consisting of a non-transitory computer-readable medium of program instructions, or a combination of hardware and software.

Figure 2:
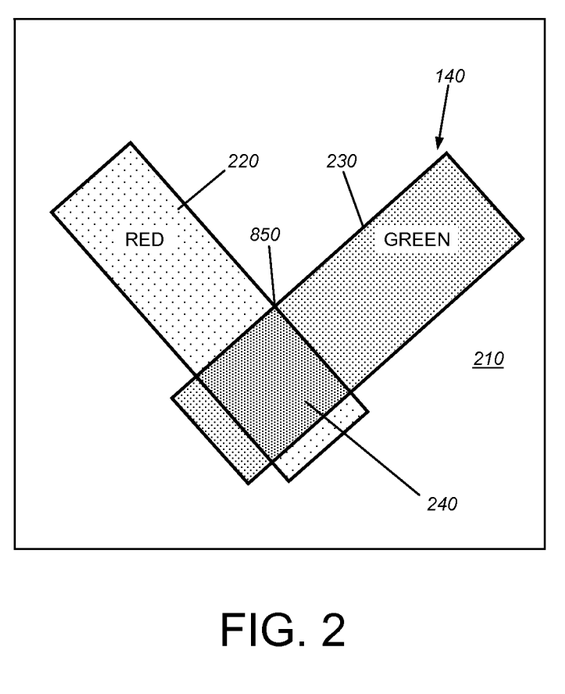
FIG. 2 is a diagram of a simplified version of an acquired image of the exemplary multi-layer printed surface of FIG. 1 showing overlap between the layers.

With reference to FIG. 2, the exemplary acquired image 140 of a simplified multi-layer printed surface 130 that will be used herein to illustrate the operational concepts of the system and method. In this example, the surface provides multi-colored layers that have been converted by the camera sensor to grayscale intensities. Alternatively a color camera sensor can be employed to provide a color runtime image as described further below. In the depicted example, the image includes a background 210, having one or more colors, shades or intensities, and two partially overlapping layers 220 and 230. The layers 220 and 230 are respectively identified, by way of example, as "RED" and "GREEN", providing two distinct colors/shades. This is exemplary of a wide range of possible differences in color, tint, shade or intensity differences between layers. The layers 220 and 230 can overlap in either of two ways (i.e. RED-over-GREEN, or GREEN-over-RED), and the resulting overlap region 240 is shown.

Figure 2A:
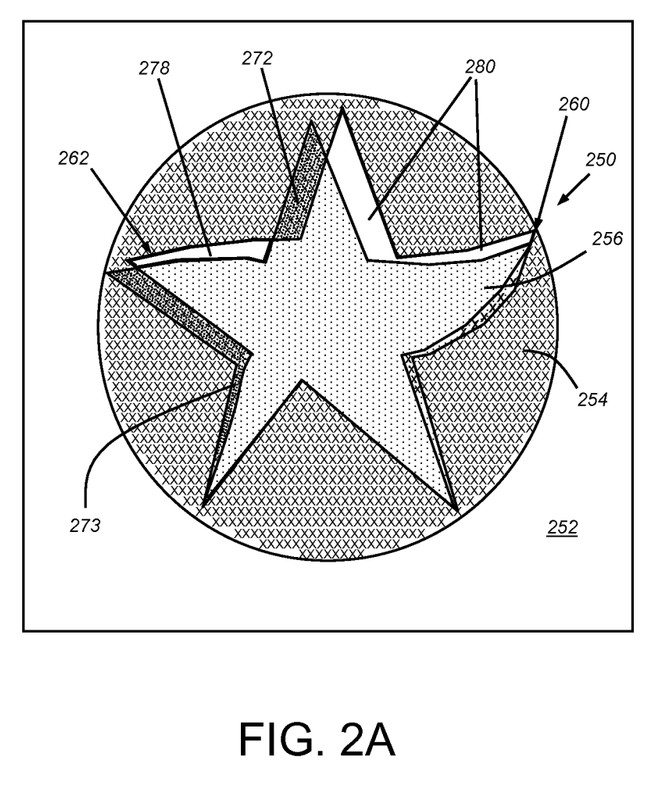
FIG. 2A is a diagram of a more-realistic acquired, exemplary runtime image illustrating effects such as distortion and variable overlap of printed layers.
Figure 2B:
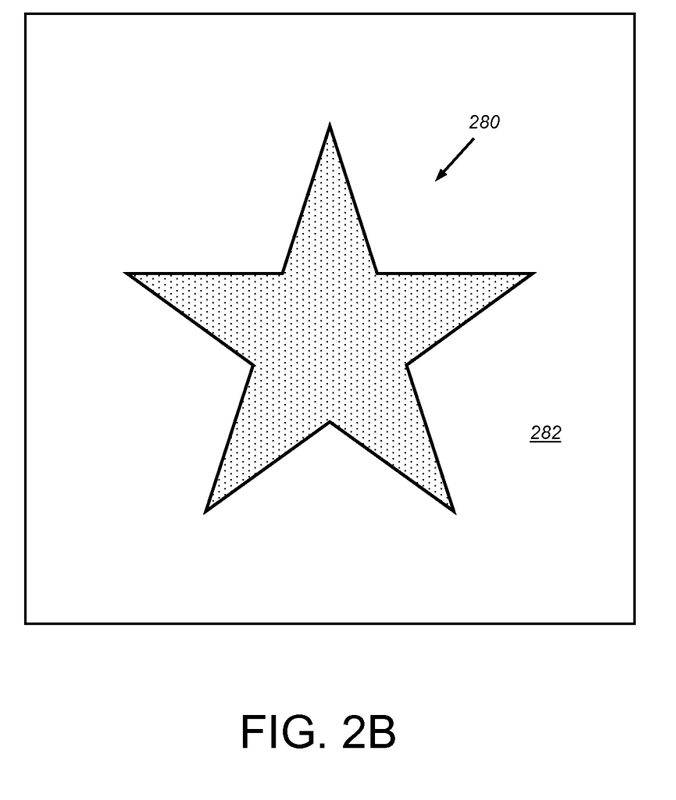
FIG. 2B is an undistorted (canonical) image representative of the inner feature of the runtime image of FIG. 2A.
Figure 2C:
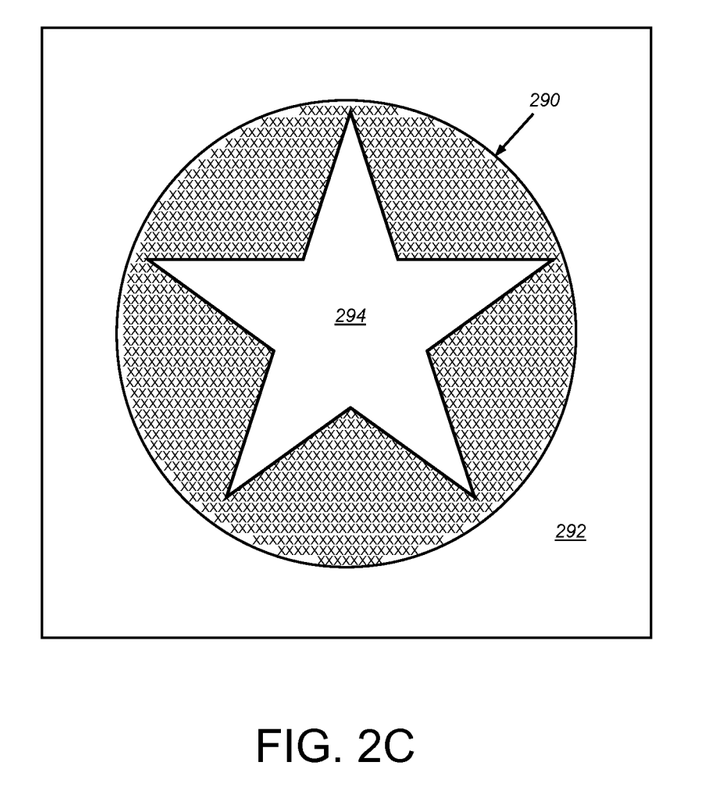
FIG. 2C is an undistorted image representative of the outer feature of the runtime image of FIG. 2A.

In order to more realistically illustrate an actual image that may be inspected using the principles of the system and method and the challenges of such a process reference is made to FIGS. 2A-2C. FIG. 2A particularly shows a runtime image of a multi-layer printed pattern 250 within a background 252. This image includes an outer printed layer 254 that defines a circular pattern with a first color and/or grayscale intensity (denoted by a field of x's). The inner pattern is a star 256 (denoted by a field of dots). Several realistic characteristics are provided that render inspection challenging. First, the image includes distortion, potentially due to printing variations and/or the shape of the substrate as exhibited by the curved, sweeping arms (e.g. 260, 262) of the star. While it is often desired that the layers remain relatively separate, typically the layers 254 and 256 variably overlap as shown, for example by regions 270, 272 and 273 in which dots and x's are mixed. Likewise, regions (e.g. 278 and 280) can be devoid of layers.

Referring to FIG. 2B, an undistorted or canonical image 280 of the star pattern and surrounding background 282 is shown. In general this exemplary image is more rectilinear, and may differ significantly from the actual runtime image pattern 256. This image is one of the bases for use in the illustrative golden template determination procedure to be described below. Likewise, an undistorted or canonical image of the outer circle pattern 290 is shown in FIG. 2C, with respective outer background regions 292 and 294. Again, this image is more regular in shape, being free of distortion/warping.

Figure 2D:
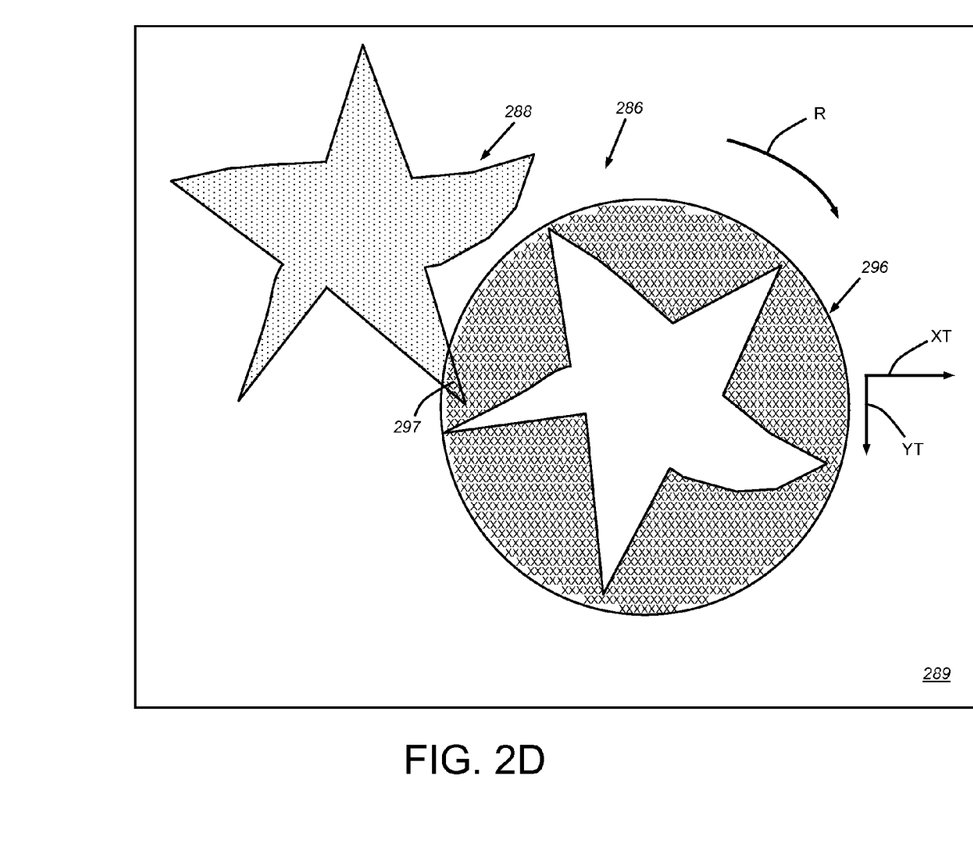
FIG. 2D is a diagram of another realistic, acquired image similar to FIG. 2A, illustrating generally that the system and method is capable of operating in the presence of substantial translation and rotation between layers.

As will be described further below, the system and method of the illustrative embodiments can produce desirable results even in cases where the layers exhibit significant translation and/or rotation with respect to each other. As shown and briefly described with reference to FIG. 2D, the runtime image 286 (with print layers similar to those of FIG. 2A) is both distorted and significantly translated and rotated. That is, the star pattern 288 resides at the upper left of the background 289, while the surrounding circle pattern 296 is rotated approximately 45 degrees (curved arrow R) and translated in both the X and Y axis (arrows XT and YT) so that only a small overlap region 297 remains between the layers. The system and method separately registers each layer (described below) and thus the operation of the illustrative system and method to generate a golden template image is agnostic to even a complete non-overlap of translated and/or rotated layers.

Figure 3:
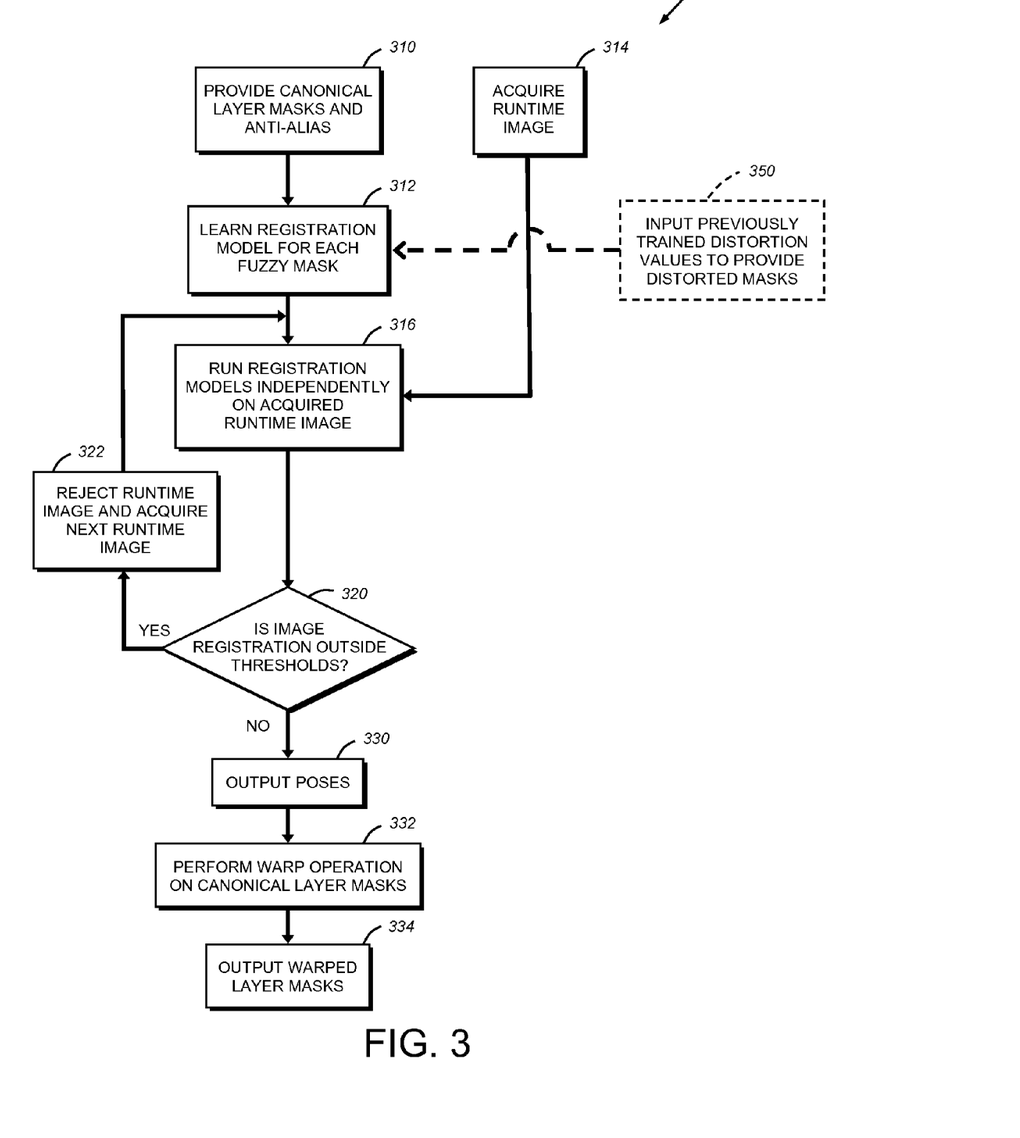
FIG. 3 is an illustrative procedure for generating warped layer masks based upon registration information provided by a runtime image for warping canonical layer mask images to generate the warped layer masks.
Figure 4:
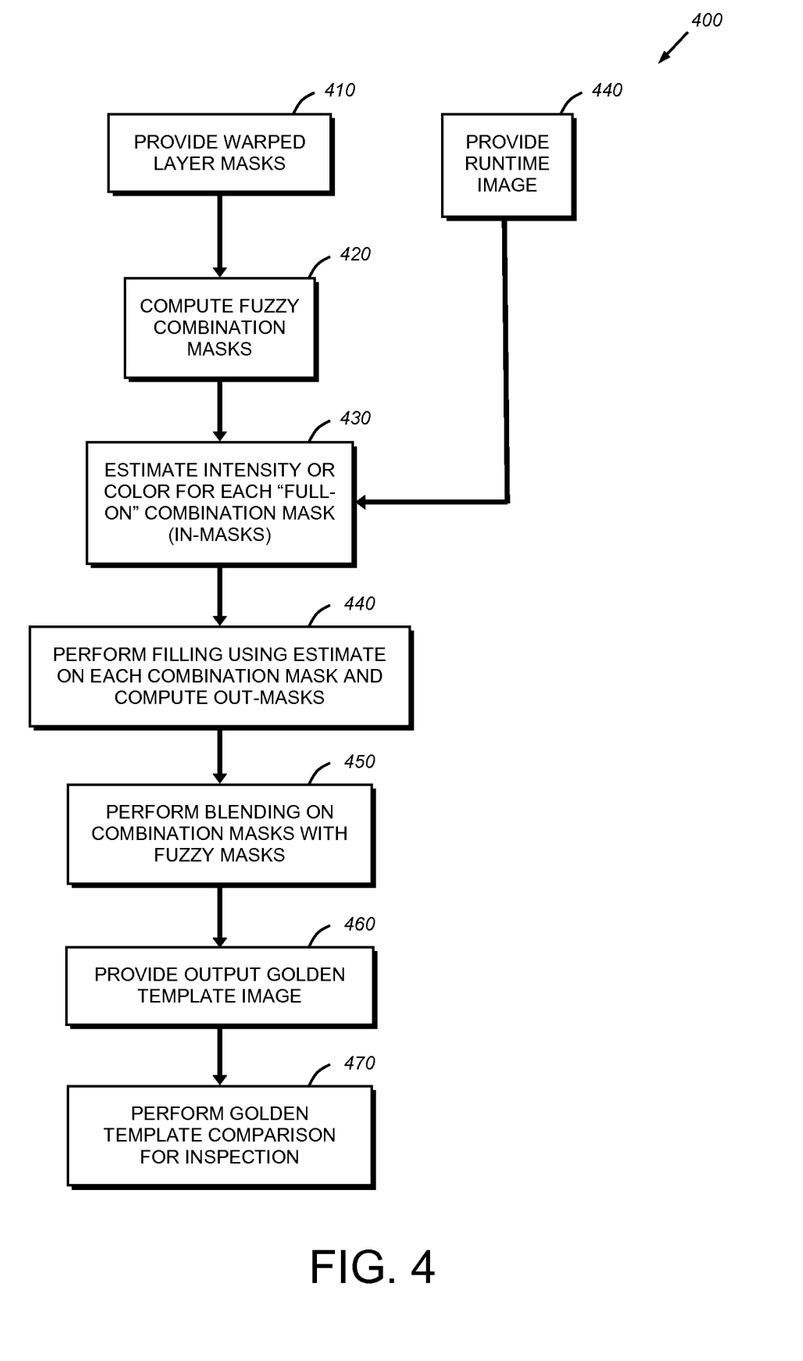
FIG. 4 is an illustrative procedure for generating and using golden templates based upon the warped layer masks generated in the procedure of FIG. 3.

Reference is now made to FIG. 3, and again to the simplified example, which shows the initial steps 300 in the overall runtime procedure for generating and using a golden template for use in a multi-layer printed pattern according to an illustrative embodiment. This part of the procedure generates warped layer masks with an appropriate registration and warp for use in the subsequent golden template generation and inspection procedure (FIG. 4). Canonical image data is provided as a set of canonical masks for each layer (and background) in step 310 (i.e. "canonical layer masks"). The canonical image data has been anti-aliased by generating a fuzzy edge. By "fuzzy edge" it is meant generally an edge that includes a band of pixels along that edge that have been assigned an intensity that is approximately intermediate between the foreground and the background, thereby eliminating a sharp contrast line therebetween. This fuzzy edge, thus, improves the result of blending of masks as described below. Based upon the image data contained in each of the canonical layer masks, the vision system learns the registration model for each mask in step 312. The vision system can perform the learning step and the subsequent registration step using a commercially available pattern registration tool, such as PatMax®, available from Cognex Corporation. Based upon each registration model, the procedure then runs the registration process on the input, acquired runtime image 314 of the multi-layer printed object at step 316. Optionally, if the registration reveals gross errors, such as a significant (based upon an acceptable, preset threshold) misalignment of the layers in the runtime image or a missing layer, then the resulting low or unacceptable score for the image causes the object to be rejected without (free of) further analysis (optional decision step 320 and optional step 322)—see for example the significantly mis-registered image of FIG. 2D, which would likely be rejected before further analysis occurs. However, the bifurcation of registration and template determination in the illustrative embodiment makes possible the formation of a golden template even in such cases. The next runtime image is input (optional step 314), and the procedure is repeated for that next image. In an embodiment, rejection of an object due to mis-registration is an option that the user can select. If registration is within an acceptable threshold, the result of running the registration model (step 316) is output of a plurality of poses (step 330) with respect to the runtime image. This pose information is used in a warp operation in step 332 to re-interpolate the canonical layer masks so that they align with the associated layer of the runtime image. This warp step (332) can be omitted in favor of pre-trained distortion information described below. This is desirable to include distortion in the masks because each layer can exhibit its own unique distortion with respect to the canonical layer mask. For example, in a pad-printing process there are a variety of variables that can cause a unique distortion in the transferred pattern. The warping process thereby generates an output set of "warped layer masks" 334 that are used in the generation of golden templates as described below.

Because the estimation of non-linear distortion can be computationally expensive it is contemplated that (in an embodiment) the procedure 300 can instead cause the warp step to apply an affine (i.e. linear) warp to optionally predistorted models (block 350) learned initially in step 312, as distortion will typically remain relatively constant from one runtime image to another in a given production run. In such a case the registration is run (step 316) on warped masks, allowing poses to be generated thereon in step 330.

Note, that in generating the poses, it is possible to employ a tool that performs a non-affine warp taking into account the distortion present in the runtime image, instead generating a distortion field in association with each warped layer mask. For example, the PatFlex® registration mode of the Cognex PatMax® tool can be used in an embodiment. Another equivalent tool can be employed.

Figure 5:
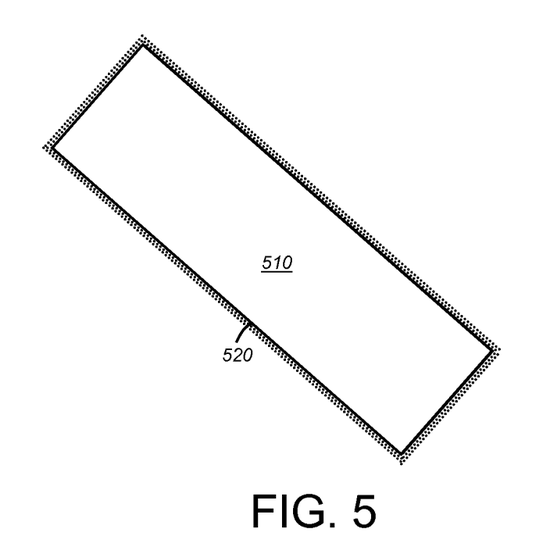
FIGS. 5 and 6 are respective full-on intensity input masks having fuzzy edges with respect to each of the exemplary layers in the acquired image of FIG. 2.
Figure 6:
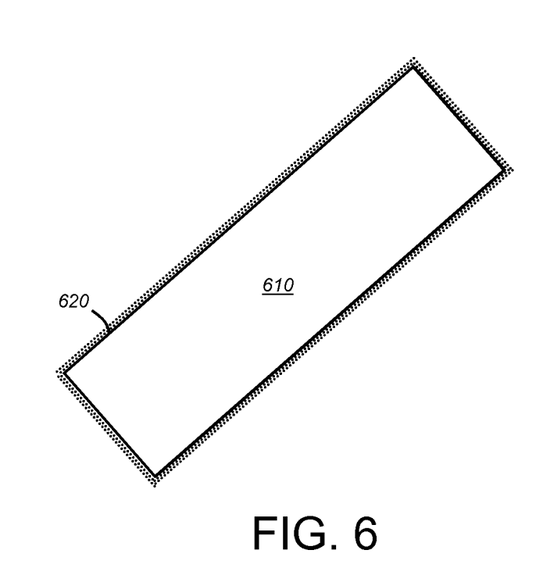
Figure 7:
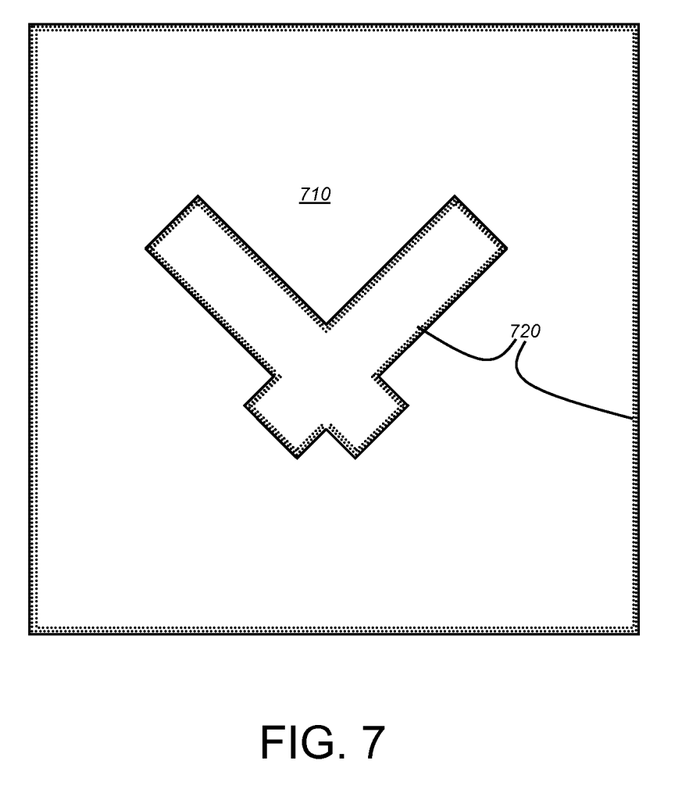
FIG. 7 is a full-on intensity input mask of the background with respect to the acquired image of FIG. 2.

With reference now to the steps 400 of FIG. 4, the procedure for generating and using golden templates is now described in further detail. This process essentially occurs "on the fly" for each runtime image that is subjected to inspection by the vision system. Warped layer masks that have been warped by the registration poses and anti-aliased by providing a fuzzy edge are provided (step 410). Note that the use of fuzzy edges is optional and highly variable, and generally avoids the existence of hard or stair-cased edges that can affect the process. By way of further illustration, FIGS. 5, 6 and 7 respectively show three schematic representations of three fuzzy masks relative to image layers 220, 230 and background 210. Each provides the above-described fuzzy edge 520, 620 and 720 that forms a transition region/zone with respect to an overlapping layer as described further below. These fuzzy, warped layer masks are used to compute combination masks in step 420. In defining a "combination mask," the following description is provided—given masks M1 and M2, the procedure generates a mask containing the overlap of M1 and M2, as well as a combination mask that contains M1 but not M2, M2 but not M1, and neither M1 nor M2—i.e. the background mask. Thus, a set of four masks can be generated for the combination of layers. Note that some combinations of masks can result in no intersection between layers, and are thus not relevant to the procedure. These combination masks can be nulled-out in the procedure. Other intersecting combination masks are used to estimate an intensity (grayscale) or color intensity for each RGB channel (depending upon the image type) in step 430, and synthesize an image in which the intensity or color is filled in. In the estimation step, the "full-on" (i.e. 255 intensity value for an 8-bit image) intensity for the combination masks is used in association with the runtime image 440 to perform the estimation. A variety of statistical techniques, such as a median computation, filtering, and the like is used to determined the intensity of the pixels in regions of the runtime image and this is employed to estimate the associated intensity in the masks. The full-on pixels of a combination mask define the so-called "in-masks" in that they include all pixels with a maximum value of 255 (or another appropriate maxima). In this case, the remaining pixels in the combination mask with values other than 255 comprise a transition.

In step 440, the filling-in procedure fills in the grayscale (or color channel) intensity of each of the foreground regions of each of the combination masks using the estimates of intensity generated in step 430. This utilizes the "out-masks" characterized by having any value larger than zero (as opposed to in-masks which only contain the maximum mask value). Then, in step 450, the fuzzy masks provided in step 420 are used for blending the estimated values for the combination mask images into a single output image. This generates the output golden template image used to perform inspection. The inspection step 470 uses the golden template to inspect the runtime image 440 using known techniques for GTC as described generally above. Also, a description of GTC is found, by way of useful background information, in U.S. Pat. No. 5,850,466, entitled GOLDEN TEMPLATE COMPARISON FOR ROTATED AND/OR SCALED IMAGES, by Jean-Pierre Schott, the teachings of which are expressly incorporated herein by reference.

Note that it is contemplated in an embodiment, that an estimation of intensity for the overall background region can be optionally performed. Such an overall background region is defined as a region consisting of pixel locations that commonly fall in the respective background regions of each of (all) the warped layer masks.

It should be noted that the use herein of 255 as a maximum intensity value for in-masks and >0 for out-masks is only one of a wide number of alternative values for these. For example, >235 can be chosen for in-masks and >10 can be chosen for out-masks. This parameter can also be user-set via the system interface in various embodiments.

Figure 8:
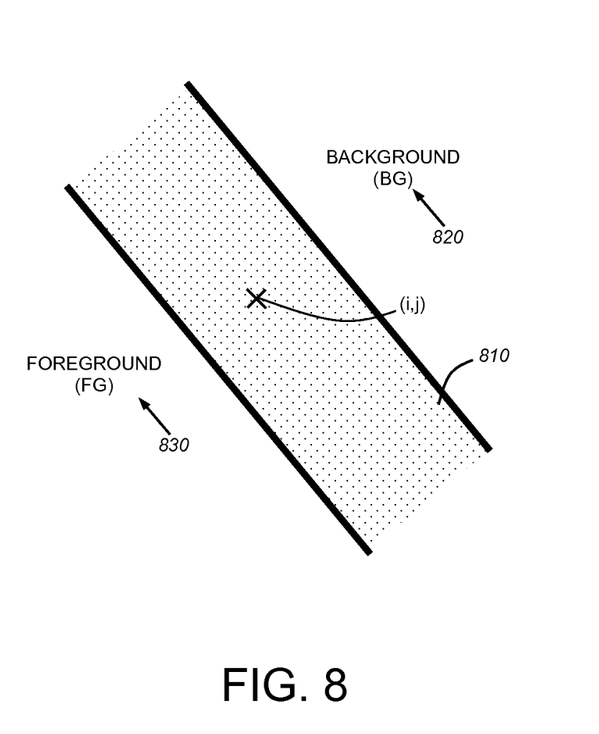
FIG. 8 is a diagram of an exemplary transition zone containing overlapping pixels for each of a plurality of layers.

In an illustrative embodiment, the blending step can entail modeling the transition from the background to the foreground at each given position (i, j) within the transition zone. With reference to a simplified example in FIG. 8, the transition zone 810 between overlapping background (BG) 820 region and foreground (FG) 830 region within the layer includes an background mask gray level value $M_{BG(ij)}$ relative to the location (i, j) and an foreground mask gray level value $M_{FG(ij)}$. The intensity value for the background is $I_{BG}$ and the intensity value for the foreground is $I_{FG}$. Thus, for that location (i, j), the modeled value is determined by the equation:

$$\frac{M_{FG(ij)}(I_{FG}) + M_{FG(ij)}(I_{BG})}{M_{FG(ij)} + M_{BG(ij)}}$$

Note that the estimated intensities $I_{FG}$ and $I_{BG}$ for foreground and background in the above equation are shown as position-invariant. Alternatively, the intensities can be made position dependent. Position-invariant intensities can be obtained from a global median filtering computation as described further below, whilst position-dependent intensities can be obtained from using an N-by-M (pixel region) median filter to estimate the intensity therein. Also, in cases where one or more additional layer(s) intersect the transition zone, then the above blending equation includes additional terms as defined generally above in order to accommodate the contribution of additional layer. Notably, the above approach is not dependent upon the physics of the underlying object material (transparent opaque, etc.), or the manner in which the colors combine.

Note that other approaches to intensity value estimation are expressly contemplated. In general a large-kernel median filtering is effective in providing an intensity value per pixel for each combination mask. However in some processes this is a slower approach than desired for throughput. Alternatively the procedure can employ a global median mode that provides a single intensity value over a region, and fills all pixels with this value, and can thereby operate more quickly to generate a sufficiently useful golden template. Other statistical and/or averaging modes (known in the art) are expressly contemplated for generating optimal pixel intensity profiles for the object layers. Given the desired throughput, a user can select the mode.

Note that the general principles described above can be altered in the case of a pixel/location in a transition zone that covers multiple layers (i.e. location 850, shown in FIG. 2—which is RED, GREEN and background). In this case weights can be assigned for a transition pixel covered by the plurality regions. By way of example, if a pixel defines a value of 40 for RED and a value of 60 for GREEN, then the pixel will be classified as belonging to the collective RED+GREEN combination mask with weight 40, to the background combination mask with 195, to the RED-only combination mask with weight 0, and to the GREEN-only combination mask with weight 0.

One illustrative approach to assigning an intensity value to a pixel in the blended fuzzy combination mask where two layers with differing warped layer mask values overlap in the transition zone, can be to assign the minimum intensity to the value between the two overlapping pixels. Alternatively, instead of a minimum, a mean value between the overlapping pixels, or another metric, such as the maximum, can be used in an alternative metric for assigning the intensity value. Thus, if transition-zone GREEN pixel has a value of 40 and adjacent transition-zone RED pixel has a value of 60, the system can use 40 (the minimum) for the combination mask, or 50 (the mean) for the combination mask, or 60 (the maximum).

To further summarize, it should be clear that each pixel location within an image herein can be characterized by a variety of types of values in accordance with illustrative embodiments (for example, at least five different values) including:

a. the runtime input image pixel value;
b. the mask value in each warped layer mask, to mark whether a particular pixel location belongs to the foreground region, the background region, or the transition region/zone of that layer;
c. the mask value in each distinct combination mask, also to mark foreground, background and transition regions/zones—in addition, a binarized version of this is the "in-mask" used for estimating pixel values and a different binarized "out-mask" is used for filling-in, and the non-binarized (fuzzy) version is used as weights in blending;
d. the estimated image intensity value for each pixel location in each combination mask; and
e. the output result image pixel value, as a weighted average of the value from (d) with weights from the value of (c).

It is expressly contemplated in various embodiments that some or all of the combination masks can be employed to derive/generate weighting masks (for example a "don't care mask" that can be used to filter out certain information). Such weighting masks can be used in subsequent inspection tasks.

It should be clear that the system and method for generating golden template images according to this embodiment provides a more robust solution in which geometric registration is separated from the inspection of presence or absence of ink in the pattern of a layer. This affords advantages over traditional GTC approaches in which a train-time image is reused on a plurality of runtime images where registration between runtime images can vary, thereby confounding the inspection of presence/absence of ink. Rather, by generating registered and warped golden templates "on the fly", this disadvantage is effectively overcome.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, the term "printed" and/or "patterned" refers to any surface layer that includes a relatively distinct and uniform color, shade or tone on a portion thereof. This layer can be applied using a wide range of application techniques in addition to traditional direct or offset printing techniques. More particularly, the term "printed" should broadly include (but is not limited to) layer application techniques such as spraying, sputtering, rolling, laser-print, inkjet print, lithography, photo-resistive exposure, dry transfer and dithered (or dotted) printing. In the case of a dithered print pattern (not a solid-fill pattern) the system and method can be adapted to provide golden template images by, for example, imaging the printed material at the print dot level of resolution. A line scan camera can desirably generate such images. Given an image at the print dot level the techniques described herein can be employed to the associated layers where dots overlap. Also while the system and method herein is highly useful in inspecting overlapping layers, it is expressly contemplated that the techniques described herein can be applied to non-overlapping layers to achieve desirable results. In such cases the separated print layers are made as part of the same runtime image, and a golden template including all layers is generated. Likewise, the term "process" or "processor" as used herein should be taken broadly to include both hardware and software operations (and various combinations thereof) that can perform one or more of the depicted functional blocks or be divided in whole, or in part, amongst the various depicted functional blocks. In addition, the number of channels in which templates can be provided can be highly variable—i.e. a multi-spectral arrangement of n-channels. Furthermore, the term "mask(s)" should be taken broadly to include a variety of image data. While conventional two-dimensional pixel image masks are described herein, it is expressly contemplated that masks using other types of data encoding, such as run-length encoding (RLE), can be employed in alternate embodiments. Accordingly, this description is meant to be taken only by way of example, and not to otherwise limit the scope of this invention.

What is claimed is:

1. A method for generating golden template images in a vision system to inspect an acquired runtime image of an object with a multi-layer printed pattern comprising the steps of:

performing a registration process on runtime images using registration models each trained on respective canonical layer masks, and outputting poses;

based upon the poses, generating warped layer masks;

computing combination masks based upon differing combinations of the warped layer masks;

estimating intensity of regions for the combination masks; and blending the estimated intensity values associated with the combination masks to generate a golden template image.

2. The method as set forth in claim 1 wherein the step of estimating intensity includes estimating the intensity of an overall background region.

3. The method as set forth in claim 1 wherein the warped layer masks define a fuzzy edge that, in turn, provide combination masks with fuzzy edges in the step of computing.

4. The method as set forth in claim 1 wherein the warped layer masks are generated based upon distortion within a training image.

5. The method as set forth in claim 1 wherein the warped layer masks are generated based upon distortion in the runtime image currently acquired.

6. The method as set forth in claim 1 further comprising, providing pre-warped distortion information to warp the canonical layer masks for use in performing the step of registration.

7. The method as set forth in claim 1 further comprising, filling in image regions associated with the foreground regions of each of the combination masks based upon the step of estimating.

8. The method as set forth in claim 1 further comprising, determining intensity values for anti-aliased pixels located in transition regions of combination masks.

9. The method as set forth in claim 1 wherein the step of estimating includes performing a statistical filtering with respect to pixels in the combination masks, and assigning a discrete intensity value to each of the pixels.

10. The method as set forth in claim 1 wherein the intensity is based upon one of (a) grayscale, (b) a plurality of color channels, and (c) n-channel multi-spectral images.

11. The method as set forth in claim 1 further comprising, rejecting the acquired runtime image based upon information from the registration process that indicates the acquired runtime image exceeds predetermined registration parameters.

12. The method as set forth in claim 1 further comprising, based upon the golden template image, performing a golden template comparison (GTC) with respect to the acquired runtime image.

13. The method as set forth in claim 1 further comprising, generating, based upon at least some of the combination masks, weighting masks that are employed for use in association with an inspection task.

14. The method as set forth in claim 1 wherein the step of estimating is performed on some or all of foreground regions for some or all of the combination masks.

15. A system for generating golden template images in a vision system to inspect an acquired runtime image of an object with a multi-layer printed pattern comprising:

a registration tool that performs registration on runtime images using registration models each trained on respective canonical layer masks, and that outputs poses;

a tool constructed and arranged to (a) generate a plurality of warped layer masks based upon the poses and (b) compute a plurality of combination masks based upon differing combinations of the warped layer masks;

an estimation process that estimates intensity of regions for the combination masks; and a blending process that blends the estimated intensity values associated with the combination masks to generate a golden template image.

16. The system as set forth in claim 15 wherein the estimation process estimates the intensity of an overall background region.

17. The system as set forth in claim 15 wherein the warped layer masks define a fuzzy edge that, in turn, provide combination masks with fuzzy edges in the step of computing.

18. The system as set forth in claim 15 wherein the warped layer masks are warped based upon distortion within a training image.

19. The system as set forth in claim 15 wherein the warped layer masks are warped based upon distortion in the runtime image currently acquired.

20. The system as set forth in claim 15 further comprising pre-warped distortion information to warp the canonical layer masks for use in performing the registration.

21. The system as set forth in claim 15 wherein image regions associated with the foreground regions of each of the combination masks are filled-in for the estimation process.

22. The system as set forth in claim 15 wherein the estimation process determines intensity values for anti-aliased pixels located in transition regions of combination masks.

23. The system as set forth in claim 15 the intensity values for pixels in combination masks are determined with a statistical filtering, and a discrete intensity value is assigned to each of the pixels.

24. The system as set forth in claim 15 wherein the intensity is based upon one of (a) grayscale, (b) a plurality of color channels, and n-channel multi-spectral images.

25. The system as set forth in claim 15 wherein the registration tool comprises a tool that performs an affine transform between the canonical layer masks and the acquired runtime image.

26. The system as set forth in claim 15 wherein the multi-layer printed pattern of the acquired image comprises at least one of a sprayed, sputtered, rolled, laser-printed, inkjet printed, lithographed, photo-resistive exposed, dry transferred and dithered image.

* * * * *